US012072986B2

(12) United States Patent
Starr

(10) Patent No.: US 12,072,986 B2
(45) Date of Patent: Aug. 27, 2024

(54) INTELLIGENT VULNERABILITY LIFECYCLE MANAGEMENT SYSTEM

(71) Applicant: trackd, inc., Reston, VA (US)

(72) Inventor: Michael C. Starr, Reston, VA (US)

(73) Assignee: trackd, inc., Reston, VA (US)

( * ) Notice: Subject to any disclaimer, the term of this patent is extended or adjusted under 35 U.S.C. 154(b) by 83 days.

(21) Appl. No.: 17/929,676

(22) Filed: Sep. 2, 2022

(65) Prior Publication Data

US 2023/0064373 A1 Mar. 2, 2023

Related U.S. Application Data

(60) Provisional application No. 63/260,869, filed on Sep. 2, 2021.

(51) Int. Cl.
*G06F 21/57* (2013.01)
*G06F 21/55* (2013.01)

(52) U.S. Cl.
CPC .......... *G06F 21/577* (2013.01); *G06F 21/552* (2013.01)

(58) Field of Classification Search
CPC .............................. G06F 21/577; G06F 21/552
See application file for complete search history.

(56) References Cited

U.S. PATENT DOCUMENTS 10,242,201 B1* 3/2019 Chen ...................... G06N 20/00
11,921,861 B2* 3/2024 Kesarwani ............ G06F 16/245

2007/0168311 A1 7/2007 Genty et al.
2017/0034023 A1* 2/2017 Nickolov ............ H04L 43/0817
2018/0268257 A1* 9/2018 Ren ........................ G06T 7/001
2019/0318203 A1* 10/2019 Jou ....................... G06F 3/0482
2020/0412757 A1* 12/2020 Siddiq .................... H04L 63/20
2022/0108019 A1* 4/2022 Anand .................. G06N 20/00
2022/0138041 A1* 5/2022 Degrass ............. G06F 11/0709
714/38.1
2022/0342988 A1* 10/2022 Brunza ............... H04L 63/1408

(Continued)

FOREIGN PATENT DOCUMENTS

AU 2022224845 2/2024

OTHER PUBLICATIONS

Notice of Grant of Australian Patent 2022224845, dated Feb. 15, 2024, 1 page.

(Continued)

*Primary Examiner* — Meng Li
(74) *Attorney, Agent, or Firm* — Gregory A. Walters; Walters IP Law

(57) ABSTRACT

A system includes a security and vulnerability analysis processor, one or more endpoint devices in communication with the security and vulnerability analysis processor through a communication network, and a vulnerability data ingestion processor configured to obtain, from one or more data sources, security data associated with the one or more endpoint devices. The security and vulnerability analysis processor includes a machine learning model configured to generate predictions about the risk impact of conducting vulnerability remediations to a particular endpoint device of the one or more endpoint devices. The machine learning model is trained using a training set comprising the security data associated with the one or more endpoint devices.

31 Claims, 7 Drawing Sheets

(56) References Cited

U.S. PATENT DOCUMENTS

2023/0036289 A1* 2/2023 Shah .................... G06V 10/751
2023/0064373 A1* 3/2023 Starr .................... G06F 21/577

OTHER PUBLICATIONS

Australian Examination Report No. 2 for Australian Patent Application 2022224845, dated Jul. 14, 2023, 4 pages.
Australian Notice of Acceptance for Australian Patent Application 2022224845, dated Oct. 24, 2023, 4 pages.
Australian Examination Report No. 1 for Australian Patent Application 2022224845, dated Oct. 26, 2022, 7 pages.

* cited by examiner

INTELLIGENT VULNERABILITY LIFECYCLE MANAGEMENT SYSTEM

CROSS-REFERENCE TO RELATED APPLICATIONS

The present application claims the benefit of U.S. Provisional Application No. 63/260,869, filed Sep. 2, 2021, which is incorporated herein by reference in its entirety for all purposes.

TECHNICAL FIELD

This application relates to an intelligent vulnerability lifecycle management system using machine learning models for enhancing the security of a range of endpoint computing devices.

BACKGROUND

Thousands of new vulnerabilities afflicting applications, operating systems, and hardware systems are disclosed every year. It is exceedingly difficult for those responsible for their environment's vulnerability lifecycle management to keep track of these new vulnerabilities, maintain an accurate inventory of their endpoints, attribute these vulnerabilities to their endpoints, keep track of vendor's publication of fixes for vulnerabilities or a vendor statement contrary to a vulnerability disclosure, and apply patches to the affected endpoints.

In the best case scenario, there exists a team tasked with vulnerability management making an effort in each of the aforementioned stages of the vulnerability lifecycle. However, that is rarely the case as doing so is extremely time consuming and expensive. In addition, the tools to do this efficiently, if at all, simply do not exist. Finally, those responsible for remediation are hesitant to apply patches at all, because the impact of applying a patch to an endpoint is unknown until it's applied, but the initial assumption is that applying the patch is expected to be catastrophic. This results in endpoints remaining vulnerable to cyber attacks because in too many instances patches necessary to remediate vulnerabilities go unapplied.

Machine learning (ML) and artificial intelligence (AI) processes have become increasingly available for application to solving myriad problems and producing solutions that were previously unobtainable. Multiple open frameworks have been published and are widely used to ease the development of highly specialized and focused ML/AI models. A market in which open high-fidelity ML/AI models are not yet widely available is the cyber security landscape.

SUMMARY

Systems and methods for automating the vulnerability lifecycle management of an environment and its endpoints are described.

According to one innovative aspect of the subject matter described in this application, a system includes a security and vulnerability analysis processor, one or more endpoint devices in communication with the security and vulnerability analysis processor through a communication network, and a vulnerability data ingestion processor configured to obtain, from one or more data sources, security data associated with the one or more endpoint devices. The security and vulnerability analysis processor includes a machine learning model configured to generate predictions about the risk impact of conducting vulnerability remediations to a particular endpoint device of the one or more endpoint devices, wherein the machine learning model is trained using a training set comprising the security data associated with the one or more endpoint devices.

The system may include one or more of the following optional features. As part of the system, conducting vulnerability remediations may include the security and vulnerability processor instructing the automated application of one of a security patch or a software update to the one or more endpoint devices. The one or more endpoint devices may generate instruction execution telemetry data representing the operating status of processes running on the endpoint devices, and the telemetry data may be fed back to the machine learning model to generate modified predictions about the risk impact of conducting vulnerability remediations to the particular endpoint device.

Each of the one or more endpoint devices may include an endpoint agent processor configured to collect and report application, operating system, hardware data, and subsequent changes to the security and vulnerability analysis processor. The endpoint agent processor may further include a registration and reporting module configured to conduct initial registration of the one or more endpoint devices and the endpoint agent, a data collection module configured to obtain all application, operating system, and/or hardware data represented by the one or more endpoint devices, a change monitoring module configured to monitor for any changes to the local application, operating system, and/or hardware execution data on the one or more endpoint devices, and an instruction collection module configured to retrieve and execute instructions from the security and vulnerability analysis processor.

The security and vulnerability processor may send instructions to the one or more endpoint devices and trigger reporting and communication of the instruction execution telemetry data back to the security and vulnerability processor. The system may further include an endpoint data collection module in communication with the security and vulnerability analysis processor, wherein the endpoint data collection module is configured to receive host reports from a registered endpoint agent or an endpoint proxy. The system may further include a vulnerability and endpoint data correlation module in communication with the security and vulnerability analysis processor, wherein the vulnerability and endpoint data correlation module is configured to attribute vulnerabilities to applications, operating systems, and/or hardware data associated with a registered endpoint agent or an endpoint proxy. The system may further include an endpoint registration module in communication with the security and vulnerability analysis processor, wherein the endpoint registration module is configured accept a registration request from a registered endpoint agent or an endpoint proxy.

According to another innovative aspect of the subject matter described in this application, a method is disclosed for executing a vulnerability lifecycle management process in an environment including one or more applications, operating systems, and/or hardware platforms includes ingesting and then contextualizing vulnerability data from one or more sources; receiving and then contextualizing application, operating system, and hardware data from an agent running on one or more endpoint devices or as a proxy representing endpoints unable to receive the agent; ingesting and then contextualizing one or more of security advisories and bulletins which include but are not limited to patches fixing vulnerabilities and/or bugs in vendor software, operating systems, and/or hardware; ingesting and then contextualizing one or more vendor statements regarding vulnerability applicability to the vendor's software, operating system, and/or hardware; and correlating the contextualized vulnerability data with the contextualized application, operating system, and/or hardware data of the endpoints to generate a set of vulnerability afflictions.

The method may include one or more of the following optional features. For example, the method may include correlating the contextualized vulnerability data with the contextualized security advisories and bulletins to identify a status of patch availability and the version of application, operating system and/or hardware for which the patch is available and vulnerabilities the patch remediates. The method may include correlating the contextualized vulnerability data with the contextualized vendor statements to identify a stage for which vulnerabilities are in as it relates to the vulnerability management lifecycle. The method may include generating the manual or automatic instruction of endpoints to install available patches either immediately upon availability or scheduling for a point in the future to remediate the vulnerabilities in their applications, operating systems, and/or hardware. The method may further include monitoring and reporting of additions, changes, and/or removal of applications, operating systems, and/or hardware in real-time by agents or proxies. The method may further include including receiving requests from agents to register themselves. The method may further include receiving requests from agents to publish host reports which include but are not limited to application, operating system, and/or hardware data. The method may further include retrieving instructions by and for agents which include but are not limited to conducting software updates, installing patches, and/or removing software on the system(s) for which the agent or proxy are responsible.

According to another innovative aspect of the subject matter described in this application, a method is disclosed for executing a vulnerability lifecycle management process in an environment including one or more applications, operating systems, and/or hardware platforms. The method includes ingesting and then contextualizing vulnerability data from one or more sources; receiving and then contextualizing application, operating system, and hardware data from an agent running on one or more endpoint devices or as a proxy representing endpoints unable to receive the agent; ingesting and then contextualizing one or more of security advisories and bulletins which include but are not limited to patches fixing vulnerabilities and/or bugs in vendor software, operating systems, and/or hardware; and ingesting and then contextualizing one or more vendor statements regarding vulnerability applicability to the vendor's software, operating system, and/or hardware. The method also includes correlating the contextualized vulnerability data with the contextualized application, operating system, and/or hardware data of the endpoints to generate a set of vulnerability afflictions; correlating the contextualized vulnerability data with the contextualized security advisories and bulletins to identify a status of patch availability and the version of application, operating system and/or hardware for which the patch is available and vulnerabilities the patch remediates; correlating the contextualized vulnerability data with the contextualized vendor statements to identify a stage for which vulnerabilities are in as it relates to the vulnerability management lifecycle; and generating the manual or automatic instruction of endpoints to install available patches either immediately upon availability or scheduling for a point in the future to remediate the vulnerabilities in their applications, operating systems, and/or hardware. The method also includes receiving requests from agents to register themselves; receiving requests from agents to publish host reports which include but are not limited to application, operating system, and/or hardware data; retrieving instructions by and for agents which include but are not limited to conducting software updates, installing patches, and/or removing software on the system(s) for which the agent or proxy are responsible; and monitoring and reporting of additions, changes, and/or removal of applications, operating systems, and/or hardware in real-time by agents or proxies.

According to another innovative aspect of the subject matter described in this application, an intelligent vulnerability lifecycle management system ingests and contextualizes vulnerability data, security advisories/bulletins, and vendor statements. An agent running on an endpoint or endpoint proxy service reports host application, operating system, and hardware data to the intelligent vulnerability management system. The intelligent vulnerability management system correlates reported host data to ingested vulnerability data and accurately attributes vulnerabilities with specific applications, operating systems, and hardware. The intelligent vulnerability management system also correlates vulnerability data to security advisories and bulletins and vendor statements to accurately reflect when fixes for vulnerabilities are available and then generates instructions for agents to remediate by installing the aforementioned fixes the next time the agent checks the instruction queue. Once the agent has performed the instruction the change is reported back to the intelligent vulnerability management system and the correlation engines are rerun.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
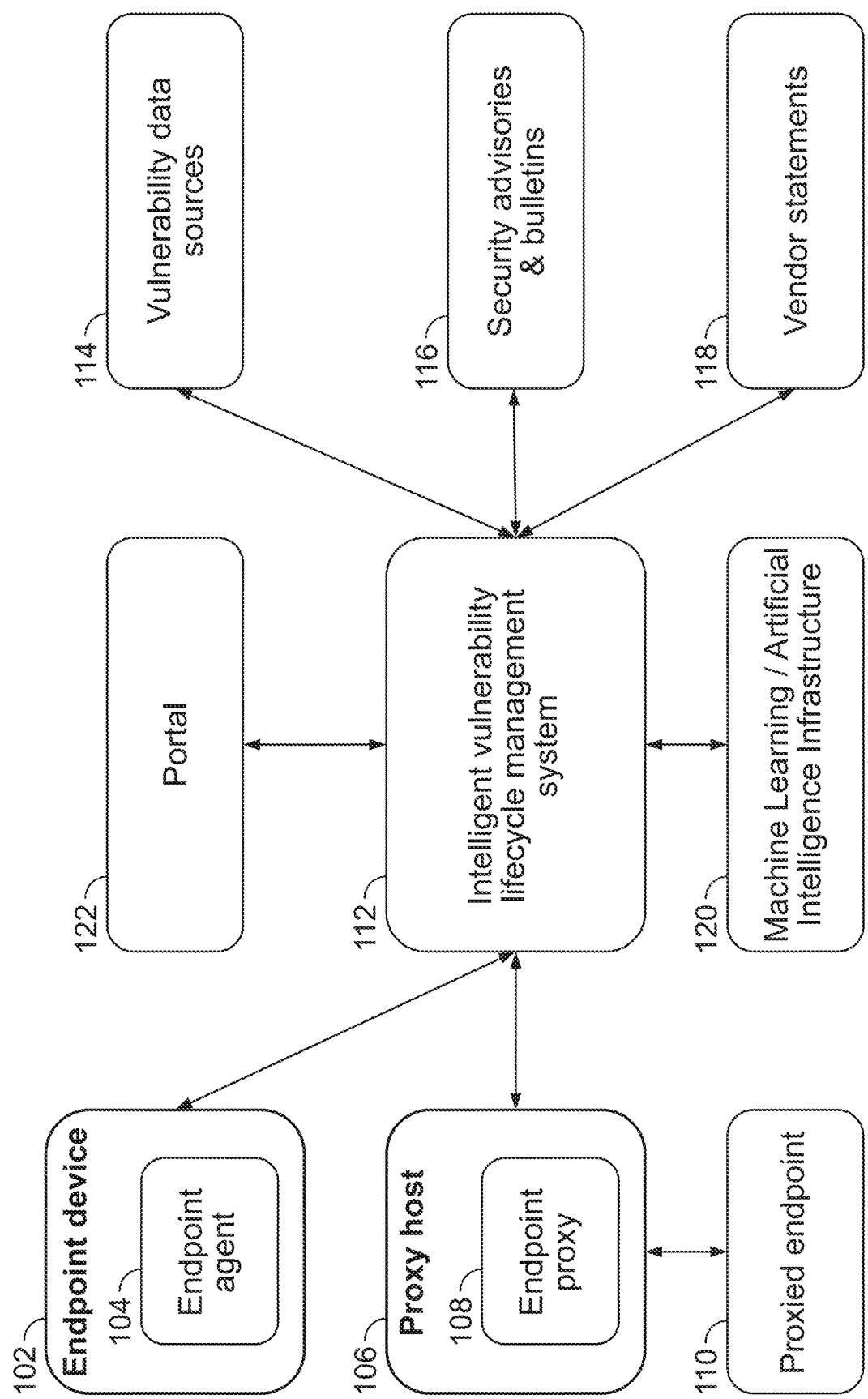
FIG. 1 is a diagram illustrating an environment in which a vulnerability lifecycle management system operates according to one implementation of the present disclosure.

FIG. 1 conceptually illustrates a computing architecture 100 in which an intelligent vulnerability lifecycle management system 112 operates in accordance with one implementation of the present disclosure. An endpoint agent 104, which may also be referred to herein interchangeably as an agent, installed on or associated with the endpoint device 102 may ensure the endpoint device 102 is registered with, reports its application, operating system, and hardware data and subsequent changes to, and retrieves instructions from the intelligent vulnerability management system 112. The endpoint agent 104 also may ensure that the endpoint device 102 the intelligent vulnerability management system 112. The instruction execution telemetry data is then passed on to the Machine Learning (ML)/Artificial Intelligence (AI) Infrastructure 120, to be analyzed and create new and updated learnings and predictions into the intelligent vulnerability management system 112 and the portal's policy engine (e.g., within portal 122) for use in the creation of new manual or automated patching rules and to inform existing manual or automated patching rules of new data to be evaluated. Examples of endpoints or endpoint devices 102 include a wide range of computing and communication devices connected to a network, such as, but not limited to laptop computers, desktop computers, mobile phones, smart phones, special purpose mobile computing devices, tablet computers, wearable computers, servers, and virtual computing environments.

For endpoints 110 that are unable to receive the installation of an agent, for example but not limited to some network devices such as switches, routers, firewalls, and wireless access points and back office equipment such as Voice over Internet Protocol (VoIP) phones, or printers, an endpoint proxy 108 can be hosted in a proxy host environment 106 either as a virtualized appliance on a hypervisor or a physical appliance. The endpoint proxy 108 will either actively query or receive data from each proxied endpoint 110 for application, operating system, and hardware data over well-known information gathering protocols, such as but not limited to simple network management protocol (SNMP) and representational state transfer (REST) queries. The mode in which the endpoint proxy 108 will operate for each proxied endpoint 110 will be determined by the capabilities and limitations of each proxied endpoint 110.

In one implementation, the intelligent vulnerability lifecycle management system 112 is aware of and monitors changes and publications to one or more vulnerability data sources 114, security advisories and bulletins 116, and vendor statements 118 and ingests and contextualizes that data as it becomes available. Each of these data source types provide unique data that the vulnerability lifecycle management system 112 uses to ensure the accurate attribution of vulnerabilities to endpoint devices 102 and proxied endpoints 110. As will be described in greater detail below, data and information from each of the sources 114, 116, 118 can be ingested and further processed to create suitable inputs for further training a machine learning model that generates predictions as part of the machine learning/artificial intelligence infrastructure 120.

As vulnerabilities are disclosed publicly, they must include a description of the vulnerability which typically includes the product(s) and version(s) affected. Additionally, the disclosure may also include structured data which allows for the affected product(s) and version(s) to be easily contextualized by the intelligent vulnerability lifecycle management system 112 using an industry standard language. However, the inclusion of structured data with a vulnerability is not required and often is not included. Furthermore, it's commonly known in the industry that the structured data can contain errors. As such, the vulnerability lifecycle management system 112 is configured to contextualize each vulnerability dynamically using artificial intelligence and machine learning techniques, such as but not limited to, natural language processing (NLP) and named entity recognition (NER) models hosted by the Machine Learning/Artificial Intelligence Infrastructure 120, regardless of the presence of structured data. If structured data is also present, that data will be used to supplement the context generated from the artificial intelligence models.

When a fix for a vulnerability, which may also be referred to herein interchangeably as a patch, is published by the vendor responsible for the patch, availability of the patch will typically be announced via a security advisory or bulletin 116, which may also be referred to herein interchangeably as a security advisory. Security advisory publications usually include, at a minimum, the version or release number of the affected binary, operating system, and/or hardware for which a set of vulnerabilities are addressed and the enumeration of each vulnerability patched in the release. Each vendor publishes this data about the patch in its own format, and often different formats for different product lines of the same vendor. As a result, the intelligent vulnerability lifecycle management system 112 must be aware of each vendor and its format(s) to accurately contextualize each security advisory. The intelligent vulnerability lifecycle management system 112 accomplishes this awareness by initially discovering the publication location of a vendor's security advisories and analyzing their structure, format, and content either via traditional web scraping tools, machine learning algorithms, such as but not limited to natural language processing, or a combination of the two, depending on the complexity of the security advisory. If this initial discovery results include the entire set of required data to complete the contextualization process, the intelligent vulnerability lifecycle management system 112 will indicate support for automated processing of the vendor's security advisories and proceed with contextualization. Otherwise, it will generate a notification for human review. Once a vendor's security advisories are marked as supported for automated processing, the intelligent vulnerability lifecycle management system 112 will periodically check for updates to ensure the latest data is incorporated when subsequent contextualization tasks are conducted.

It is not atypical for vulnerability researchers to make mistakes when publishing their vulnerability findings. Additionally, support, and especially long-term support, for certain applications, operating systems, and hardware eventually ends. As such, vendors will typically publish vendor statements 118 asserting a position or status on each vulnerability that a vulnerability researcher attributes to that vendor. Position or status assertions included in vendor statements 118 include but are not limited to those indicating that the vulnerability does not affect a certain production version claimed by the vulnerability, that the vendor will not fix the vulnerability, that the affected application, operating system, and/or hardware is out of support scope, or that the vendor does not consider the vulnerability to be an actual vulnerability. Vendors will publish these statements in differing formats, and to accurately contextualize each statement from all vendors, the vulnerability lifecycle management system 112 must be aware of each format.

After the intelligent vulnerability lifecycle management system 112 ingests and contextualizes new vulnerability data 114, security advisories and bulletins 116, and/or vendor statements 118, which may also be referred to collectively herein interchangeably as data sources, the system 112 then correlates the new data from the data sources against existing data to update the attribution of new vulnerabilities, patch availability, and vendor statements to each endpoint device 102 and proxied endpoint 110, which may also be referred to collectively herein interchangeably as an endpoint's overall vulnerability profile.

The intelligent vulnerability lifecycle management system 112 also includes an information interface such as a portal 122. The portal 122, exists to provide all users a single-point of self-service configuration and management of the intelligent vulnerability lifecycle management system 112. The portal 122, can include but is not limited to a Graphical User Interface (GUI) and an Application Programming Interface (API) service. The portal 122, can perform actions to service the GUI and API, guide users through downloading an endpoint agent 104, an endpoint proxy 108, software to be installed on an endpoint device, such as an endpoint device 102, or a proxy host 106, respectively, manage the enrollment of endpoints, create host groups to logically group similar endpoints, create manual and automated patching rules, which in turn are converted into instructions retrieved by endpoints to execute, review high level situational awareness of the user's organization's cybersecurity hygiene, as well as other operations that those skilled in the art will readily appreciate allow a user to efficiently interact with the vulnerability lifecycle management system 112.

Figure 2:
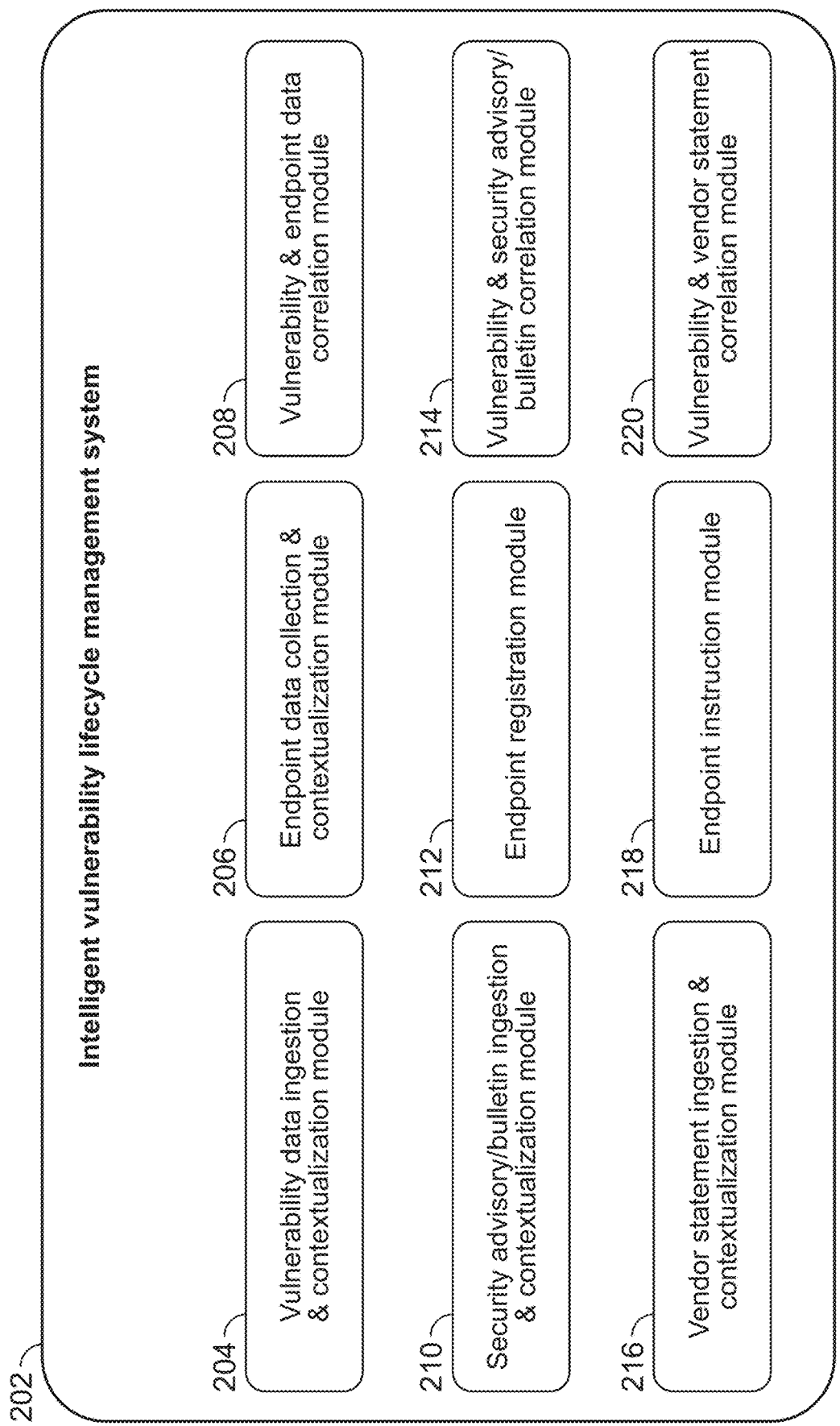
FIG. 2 is a diagram showing functional modules of the vulnerability lifecycle management system according to the implementation shown in FIG. 1.

FIG. 2 illustrates functional modules of an intelligent vulnerability lifecycle management system 202 in accordance with another implementation of the present disclosure. The intelligent vulnerability lifecycle management system 202 may include a vulnerability data ingestion and contextualization module 204 configured to monitor one or more vulnerability data sources to identify new vulnerability disclosures as well as changes to previous vulnerability disclosures. The intelligent vulnerability lifecycle management system 202 may also include a security advisory/bulletin ingestion and contextualization module 210 configured to monitor one or more security advisory data sources to identify when patches for previously disclosed vulnerabilities are available, and a vendor statement ingestion and contextualization module 216 configured to monitor one or more vendor vulnerability status sources.

The intelligent vulnerability lifecycle management system 202 also may include an endpoint data collection and contextualization module 206 configured to receive host reports from registered endpoint agents 104 and endpoint proxies 108, an endpoint registration module 212 configured to accept registration requests from the endpoint agent 104 and the endpoint proxy 108, and an endpoint instruction module 218 configured to relay sets of instructions for execution at each of the endpoint agents 104 and endpoint proxies 108. The intelligent vulnerability lifecycle management system 202 also may include a vulnerability and endpoint data correlation module 208 configured to attribute vulnerabilities to applications, operating systems, and/or hardware data, a vulnerability and security advisory/bulletin correlation module 214 configured to attribute patches for vulnerabilities attributed to applications, operating systems, and/or hardware, and a vulnerability and vendor statement correlation module 220 configured to attribute a vendor's position on a disclosed vulnerability. Each ingestion and contextualization module 204, 210, 216 is also configured to interact with the machine learning/artificial intelligence infrastructure 120, ensuring the latest data ingested by each module 204, 210, 216 is accounted for in the artificial intelligence models and that all decisions, predictions, and other output those skilled in the art would expect from ML/AI models is available to the rest of the components of the intelligent vulnerability lifecycle management platform.

The vulnerability ingestion and contextualization module 204 may be configured to check its plurality of data sources based on the prescribed set of publication schedules for each data source. Each entry from a vulnerability data source's update is added as a unique entry and maintained as such. To ensure optimized processing, the module 204 includes timestamps in all entries and only evaluates entries with timestamps newer than those previously registered. During the evaluation process of each entry, the contextualization module 204 constructs a properly formatted query to include an instruction also referred to as a prompt, historical examples of unstructured descriptions accompanied by their correctly structured-format representation, and the unstructured description for which structured output is needed, and sends the query to the machine learning/artificial intelligence infrastructure 120, which returns the generated structured vulnerability data. Additionally, contextualization module 204 checks for structured vulnerability data and adds it to the entry if it exists as a complement to its dynamically generated structured data.

The endpoint data collection and contextualization module 206 may be configured to create a new global record for each application, operating system, and/or hardware device contained within an agent's host report if it does not already exist. Additionally, the endpoint data collection and contextualization module 206 maintains an inventory of actively installed applications, operating systems, and/or hardware devices on each endpoint device 102. Applications, operating systems, and/or hardware devices are added or removed from the endpoint device's 102 inventory based on host reports received from the endpoint agent 104. The endpoint data collection and contextualization module 206 also ensures collected instruction execution telemetry data is properly preprocessed before being sent to the machine learning/artificial intelligence infrastructure 120.

The endpoint registration module 212 may be configured to accept agent registrations with valid metadata identifying an existing organization and a universally unique identification number, as well as additional system information. After the endpoint registration module 212 receives a new registration, it records the received data, instructs the endpoint data collection and contextualization module 206 to accept data from the agent's registration and reporting module 306, and replies to the endpoint 102 with an indication that the registration was successful.

The endpoint instruction module 218 may be configured to place or insert instructions for endpoint agents 104 and/or endpoint proxies 108 on a remote work queue based on interaction with the intelligent vulnerability lifecycle management system 112. The endpoint agents 104 and endpoint proxies 108 are configured to retrieve and execute instructions from the remote work queue using their instruction collection modules (e.g., instruction collection module 312). When the instruction collection modules (312) complete their instructions, the endpoint agents 104 and endpoint proxies 108 invoke their local change monitoring workflows and submit a host report if a change is detected.

The vulnerability and endpoint data correlation module 208 may be invoked after every host report and any time after new data from the data sources is ingested. This provides the accurate reflection not only of attributed vulnerabilities to an application, operating system, and/or hardware device, but also if any patches 116 or vendor statements 118 are available.

Figure 3:
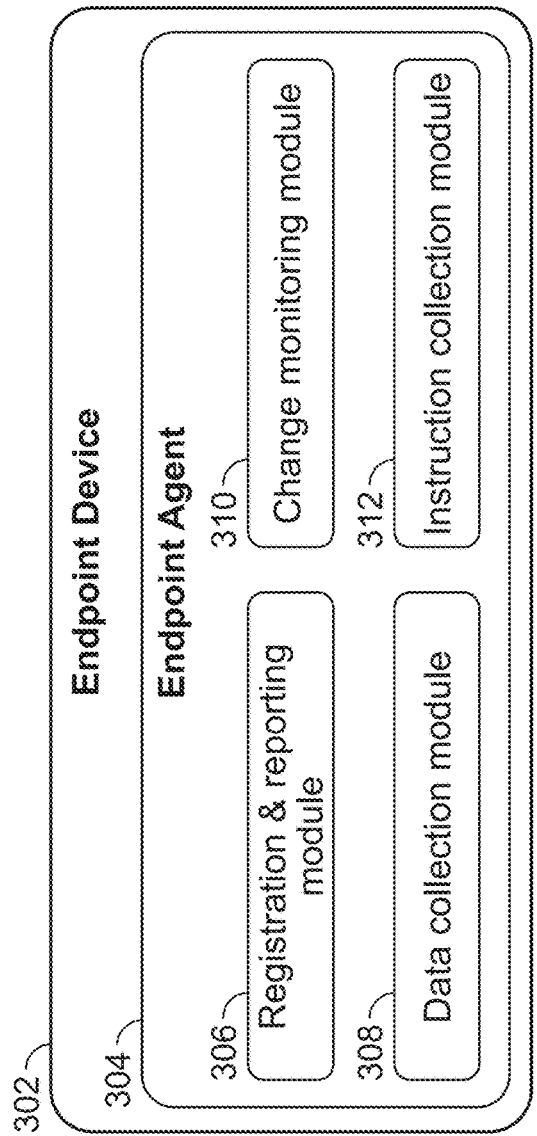
FIG. 3 is a diagram showing functional modules of an endpoint agent configured to provide vulnerability lifecycle management.

FIG. 3 illustrates functional modules of an endpoint agent 304 configured to provide intelligent vulnerability lifecycle management according to an implementation of the present disclosure. The endpoint agent 304 (which represents a non-limiting example of endpoint agent 104) associated with an endpoint device 302 includes a registration and reporting module 306 configured to conduct the initial registration of the endpoint device 302 and the agent 304 with the vulnerability lifecycle management system 112. A data collection module 308 is configured to obtain all application, operating system, and/or hardware data represented by the endpoint device 302 including any instruction execution telemetry data and/or metrics, and format it as expected by the vulnerability management lifecycle system 112. A change monitoring module 310 is configured to monitor for any changes to the local application, operating system, and/or hardware execution data on the endpoint device 302, and an instruction collection module 312 configured to retrieve and execute instructions from the vulnerability lifecycle management system 112.

Figure 4:
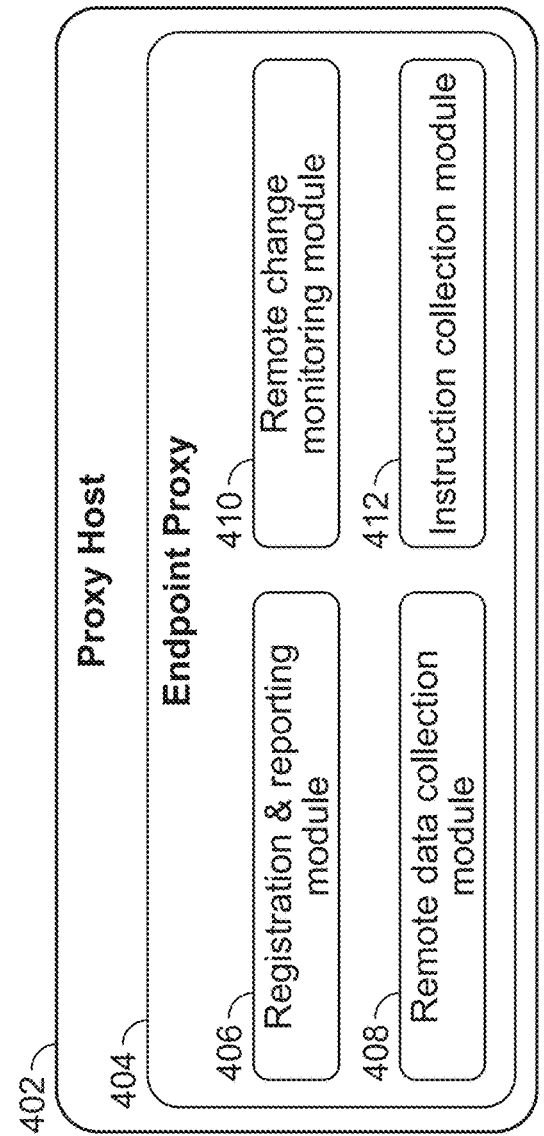
FIG. 4 is a diagram showing functional modules of an endpoint proxy configured to provide vulnerability lifecycle management.

FIG. 4 illustrates functional modules of an endpoint proxy 404 configured to provide intelligent vulnerability lifecycle management according to an implementation of the present disclosure. The endpoint proxy 404 (which represents a non-limiting example of endpoint proxy 108) hosted on a proxy host 402 includes a remote registration and report module 406 configured to conduct the initial discovery and registration of remote endpoints, such as a proxied endpoint 110, in an environment that are unable to be protected by an endpoint agent (104) operating with the vulnerability lifecycle management system 112. Examples of remote endpoints that are unable to be protected by an endpoint agent 104 include but are not limited to networking devices, such as routers, switches, and wireless access points, printers, and Voice over Internet Protocol (VoIP) phones. A remote data collection module 408 is configured to obtain all application, operating system, and/or hardware data and any instruction execution telemetry represented by the endpoints in an environment that are unable to be protected by an endpoint agent (104) and format it as expected by the vulnerability lifecycle management system 112. A remote change monitoring module 410 is configured to query and/or monitor for any changes to the remote applications, operating systems, and/or hardware on the remote endpoints (e.g. a proxied endpoint 110) in an environment that are unable to be protected by an endpoint agent (104), and an instruction collection module 412 is configured to retrieve and execute instructions from the vulnerability lifecycle management system 112.

Figure 5:
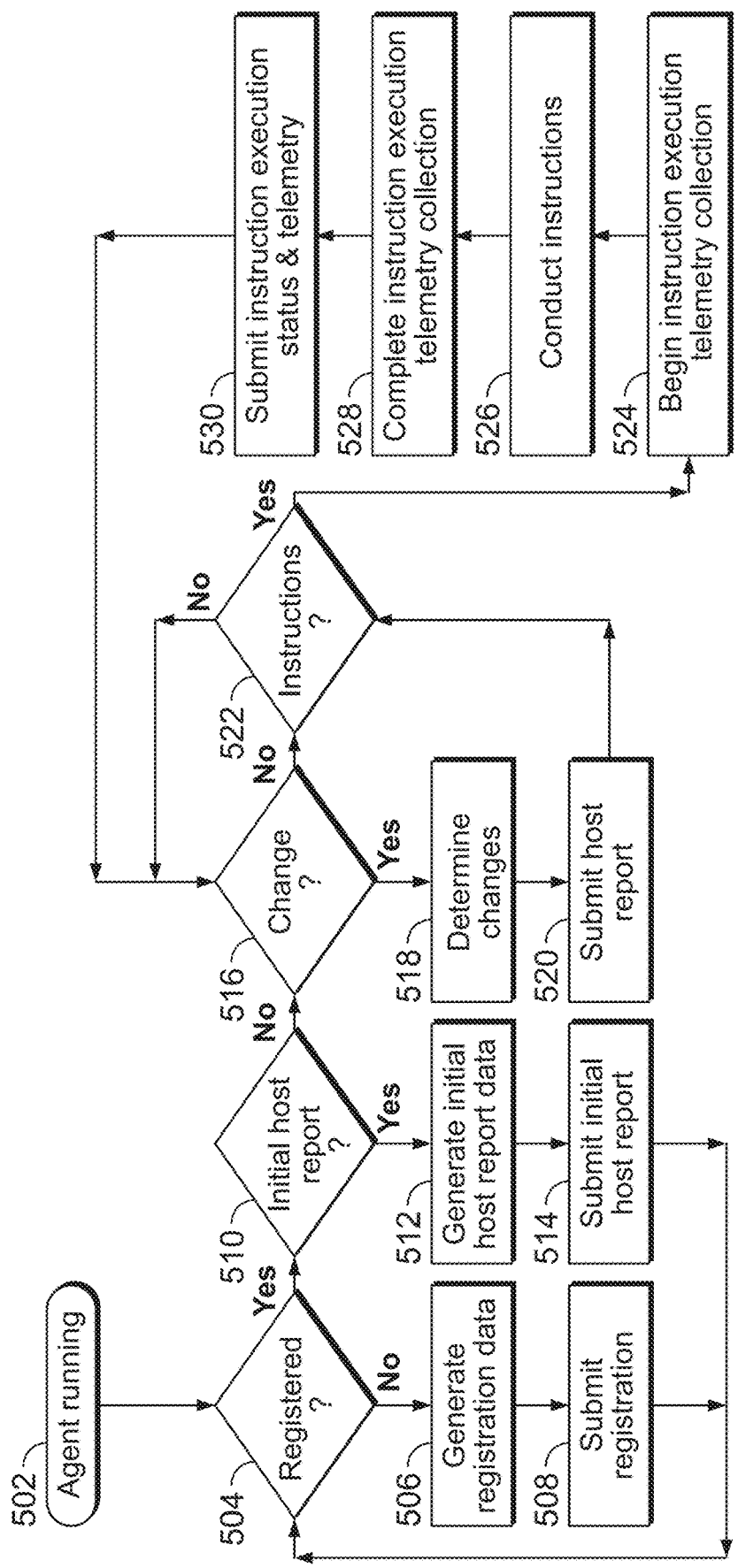
FIG. 5 is a flow diagram showing a process executed by an endpoint agent to provide vulnerability lifecycle management.

FIG. 5 is a flow diagram illustrating a process followed by an endpoint agent 304 to provide intelligent vulnerability lifecycle management according to an implementation of the present disclosure. The endpoint agent 304 when running, as shown in block 502, will check its registration status, as shown in block 504. If the endpoint agent 304 has not been previously registered, the agent 304 will generate the necessary registration data, as shown in block 506, and submit it to the vulnerability lifecycle management system 112, as shown in block 508. The endpoint agent 304 will then validate its registration status, as shown in block 504. Once the agent 304 has validated its registration status, it will check if it has successfully submitted its first host report, as shown in block 510. If an initial host report has not yet been submitted, the agent 304 will generate the necessary information, as shown in block 512, and submit it to the intelligent vulnerability lifecycle management system 112, as shown in block 514. Once the endpoint agent 304 has successfully submitted its initial host report, it will monitor for any changes to applications, operating systems, and/or hardware, as shown in block 516. If any changes are detected, the agent 304 will determine the changes, as shown in block 518, and submit a host report to the intelligent vulnerability lifecycle management system 112, as shown in block 520. Either after the submission of a host report or the absence of a change on the endpoint device 302, the agent 304 will check with the intelligent vulnerability lifecycle management system (112) for instructions it must execute, at block 522. If instructions are present, the agent 304 will begin recording pertinent information about the system, such as, but not limited to, system uptime, processes running, and resource utilization as shown in block 524 and then execute those instructions, as shown in block 526. Once the instructions have been completed, the agent 304 will finalize its recording of pertinent information about the system as shown in block 528 and then report the status of the instruction execution task and telemetry data to the intelligent vulnerability lifecycle management system 112 as shown in block 530. In either case, where instructions were executed or absent, the endpoint agent 304 will then check for changes. As shown in FIG. 5, the agent 304 will then loop between checking for and reporting changes (516) and checking for and executing instructions (522) in perpetuity, or at least in a continuous loop until stopped by the vulnerability lifecycle management system 112.

Figure 6:
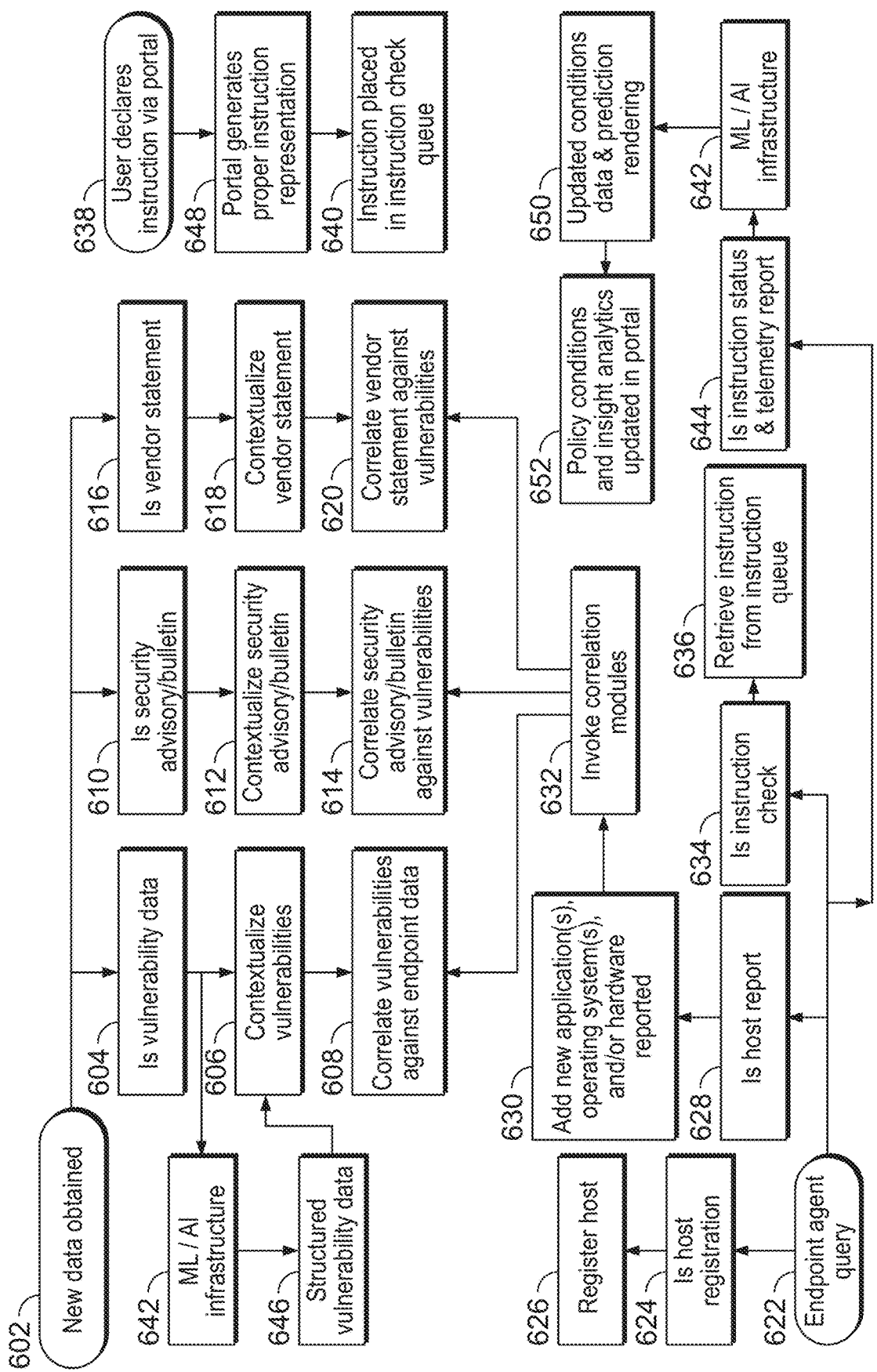
FIG. 6 is a flow diagram showing a process executed by an intelligent vulnerability lifecycle management system.

FIG. 6 is a flow diagram illustrating a process followed by an intelligent vulnerability lifecycle management system (112, 202) according to one implementation of the present disclosure. As shown, there are at least three inputs for the intelligent vulnerability lifecycle management system (112), however it is possible to have as few as one single input or more than three inputs. When new data is obtained from one of the data sources (602), it is first identified as one of three data types: vulnerability data (604), security advisory/bulletin data (610), or a vendor statement (616). Each data type gets contextualized using its respective process, as shown in blocks 606, 612, and 618. As shown, vulnerability data (604) is also forwarded to the ML/AI infrastructure 642 to generate structured vulnerability data 646 to assist and enrich the contextualization process (606). Once contextualized (606), vulnerability data is correlated against endpoint data (608), security advisory/bulletin data is correlated against existing vulnerabilities (614), and vendor statements are correlated with existing vulnerabilities (620).

With continued reference to FIG. 6, there are four types of interactions an endpoint agent 304 can have with the intelligent vulnerability lifecycle management system 112. However, it is possible to have as few as a single type of interaction or more than four types of interactions. When the vulnerability lifecycle management system 112 receives an endpoint agent query (622), it is first identified as one of four interaction classes. These four types of interaction classes include host registration, as shown in block 624, host report, as shown in block 628, an instruction check, as shown in block 634, or an instruction status and telemetry report, as shown in block 644. If the interaction is a host registration (624), the vulnerability lifecycle management system 112 registers the endpoint device 102 or proxied endpoint 110, as shown in block 626. If the interaction is a host report, the vulnerability lifecycle management system 112 adds any new applications, operating systems, and/or hardware reported, as shown in block 630, and then invokes all correlation modules (608, 614, 620) at block 632. If the interaction is an instruction check (634), the vulnerability lifecycle management system 112 will provide the querying endpoint agent 304 with instructions that the endpoint agent should execute that are stored in its queue (636). If the interaction is an instruction status and telemetry report (644), the report is exported to a data ingestion module that supports the ML/AI infrastructure (642) to be transformed into the proper format and then loaded into a prediction module (for example, prediction module 708 described in greater detail below in FIG. 7). The ML/AI infrastructure (642) (shown a second time in FIG. 6 for sake of clarity) creates updated predictions to be rendered, as shown in block 650, and then used to update policy conditions and insight analytics in the portal (e.g., portal 802), as shown in block 652. When a user interacts with the vulnerability lifecycle management system 112, they have an option to generate instructions for registered agents via the portal (638). When a user generates instructions for registered agents, the portal then generates the proper instruction representation, as shown in block 648, and then those instructions are placed on the instruction check queue (640), to be retrieved by the endpoint agent 304 during its next instruction check.

Figure 7:
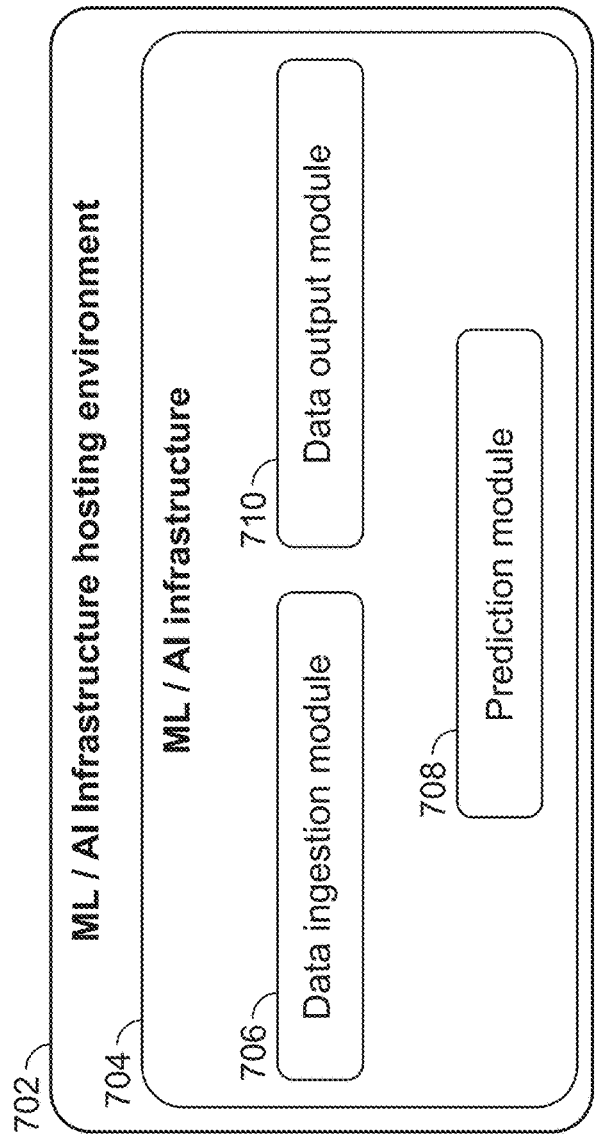
FIG. 7 is a diagram showing functional modules of a machine learning/artificial intelligence infrastructure configured to provide vulnerability lifecycle management.

FIG. 7 illustrates a machine language (ML)/artificial intelligence (AI) infrastructure hosting environment 702, and further illustrates the component processing modules including an ML/AI infrastructure 704, which may also be referred to herein interchangeably as an ML infrastructure. The ML infrastructure 704 is configured to provide intelligent vulnerability lifecycle management by conducting one or more machine learning and/or artificial intelligence processing techniques, and in some implementations data pipelining processing techniques. The ML infrastructure 704 (which represents a non-limiting example of ML/AI Infrastructure 120) operating within an ML/AI hosting environment 702 includes a data ingestion module 706, configured to receive data from various modules in the intelligent vulnerability lifecycle management system workflow depicted in FIG. 6, such as but not limited to vulnerability data 602 and/or instruction status & telemetry report data 644. A prediction module 708, is configured to take into account data from the data ingestion module 706, generate new predictions, as well as send updates to previous predictions actively being used by the intelligent vulnerability lifecycle management system 112, and publish it to a data output module 710. The data output module 710 is configured to ensure the proper routing of new predictions, and to ensure previous prediction updates are properly accounted for in the intelligent vulnerability lifecycle management system 112.

In one implementation, the data ingestion module 706, is configured to export and transform relevant data for input into a particular ML model, and then load the transformed data into the particular ML model within the prediction module 708. In some instances, this process is referred to as extraction, transformation, and loading (ETL), and also may be referred to interchangeably as data pipelining. The data ingestion module 706 is configured to extract data from one or more data repositories based on the desired prediction. In one representative implementation, the data ingestion module 706 extracts a set of like instruction status and telemetry reports to predict the likelihood of existing instructions causing disruptions when executed in future instructions. After data has been extracted, the data ingestion module 706 has the ability to apply a set of standard ML data transformation processes to the extracted data, such as, but not limited to cleaning, deduplication, format revision, or key restructuring depending on many factors, such as, but not limited to empty or null values, lack of format consistency, presence of duplicate entries, and/or the need to establish relationships across extracted data. Once the data is in the proper format expected by the ML model, the data will be loaded into the ML model either by sending the entire set of relevant data at once, or by sending only the delta between new data since last load, and data previously loaded into the ML model.

With continued reference to the ML infrastructure 704, the prediction module 708 leverages one or more machine learning (ML) models to generate the predictions. Example ML models suitable for use in connection with the prediction module 708 include but are not limited to linear regression, logistic regression, decision tree, AdaBoost, random forest, gradient boosted trees, and feed forward neural networks. The ML model is configured to make predictions about the risk and/or impact of conducting vulnerability remediations, for example, applying a software update or a security patch to an endpoint (102, 110). In some instances the risk and/or impact associated with conducting vulnerability remediations is referred to as service risk impact or SRI. The prediction module 708, leveraging one or more ML models, will be invoked by the data ingestion module 706 based on the type and amount of data, as well as the desired prediction type. As the amount of data available to the data ingestion module 706 increases, the prediction module 708 is able to make more accurate predictions with simpler ML models, such as linear regression, and allow for useful predictions with more advanced ML models, such as feed forward neural networks. In addition to using telemetry data from agents (104) and relevant data from the data sources (e.g., data sources 114, 116, 118), the prediction module 708 is able to leverage previous predictions generated by prior iterations of the ML model(s), such as but not limited to linear regression and logistic regression, to make predictions that leverage more advanced processes that would otherwise not be possible.

The prediction of the likelihood for a patch to cause a disruption to the endpoint device (102) that the patch is applied on is considered of high value and a low data requirement. The prediction module 708 can leverage a linear regression ML model to produce this prediction which is then properly routed by the data output module 710 to be referenceable by users when interacting with the portal 802 to orchestrate remediation efforts. Furthermore, with sufficient data quantities from the agent's instruction status and telemetry reports (644) coupled with predictions, such as those made by a linear regression model asserting patch disruption likelihood, more advanced ML models can be leveraged to make further reaching future predictions, such as but not limited to the likelihood of future patches that fix future vulnerabilities of a specific type but have not yet been disclosed to be disruptive. One advantage of these types of forward-looking predictions allows for vulnerability remediation teams to create thoughtful conditions for building automated remediations that meet their business objectives and risk tolerance thresholds, ultimately accelerating patch cadences while minimizing disruptions.

Predictions made by the prediction module 708, are published to the data output module 710, and include metadata about the ML model's performance and decision making as well as the actual prediction. The data output module 710 is aware of each ML model's prediction publication format, and ensures each component of the published prediction and its metadata is routed to the proper data storage location. Once the data has been published to all proper locations, components within the portal 802 (described in greater detail below) will display the updated data the next time they are loaded by users. In one implementation the data output module 710 is a data store configured to hold the predictions. The data output module 710 may organize the predictions according to a predetermined organizational schema such as a database so that the predictions can be located quickly for immediate use. Alternatively, the data output module 710 may store the predictions as a block or batch of bulk data, which then triggers a subsequent processing task that further processes the predictions and populates a database with the predictions.

Figure 8:
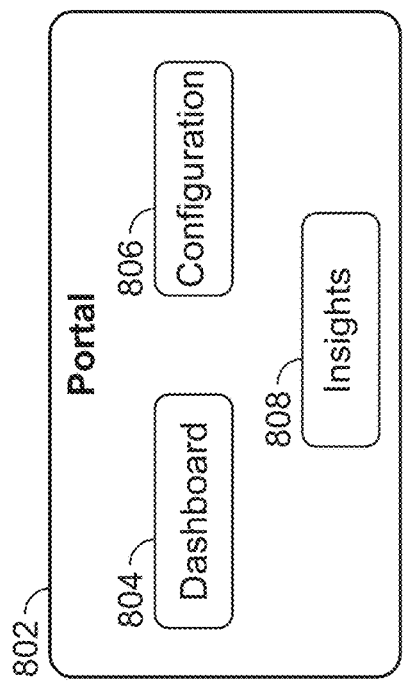
FIG. 8 is a diagram showing functional modules of a user interface portal configured to manage a vulnerability lifecycle management system.

FIG. 8 illustrates functional modules of a portal 802, configured to provide a graphical user interface to manage an intelligent vulnerability lifecycle management system (112, 202) according to an implementation of the present disclosure. The portal 802 (which represents a non-limiting example of portal 122) includes a dashboard 804, configured to provide high-level or summary actionable insights about a user's environment as it relates to an intelligent vulnerability management system (112). In one implementation, the dashboard 804 may be configured to display vulnerability remediation over time, and vulnerability proliferation over time, using various graphical representations. A configuration module 806, allows users to customize the specifics for how any particular patch is applied based on endpoint data, vulnerability data, and ML/AI predictions, among others. An insights module 808, is configured to provide detailed information and insights about a user's environment as it relates to the intelligent vulnerability management system (112, 202).

In one implementation, the configuration module 806 displays a series of selections that allow the user to orchestrate the delivery of patches to endpoint devices (102). The user is able to organize devices into logical groups and apply tags to further attribute classifications to those same endpoint devices which are then used by a remediation rules engine (integrated within the configuration module 806) to schedule delivery of the patches. The delivery of patches is based on a number of traditional patch management selections, such as, but not limited to number of devices and date/time, in addition to analytic- and ML/AI-informed predictions, such as, but not limited to likelihood for disruption, previously detected disruptions, patch installation count, and predicted disruption duration. Users may also use the telemetry data, including but not limited to, percentage of successful patch installation, percentage of detected or reported disruptions, or time since previous remediation, associated with previously executed remediation rules to inform the execution of subsequent rules.

Figure 9:
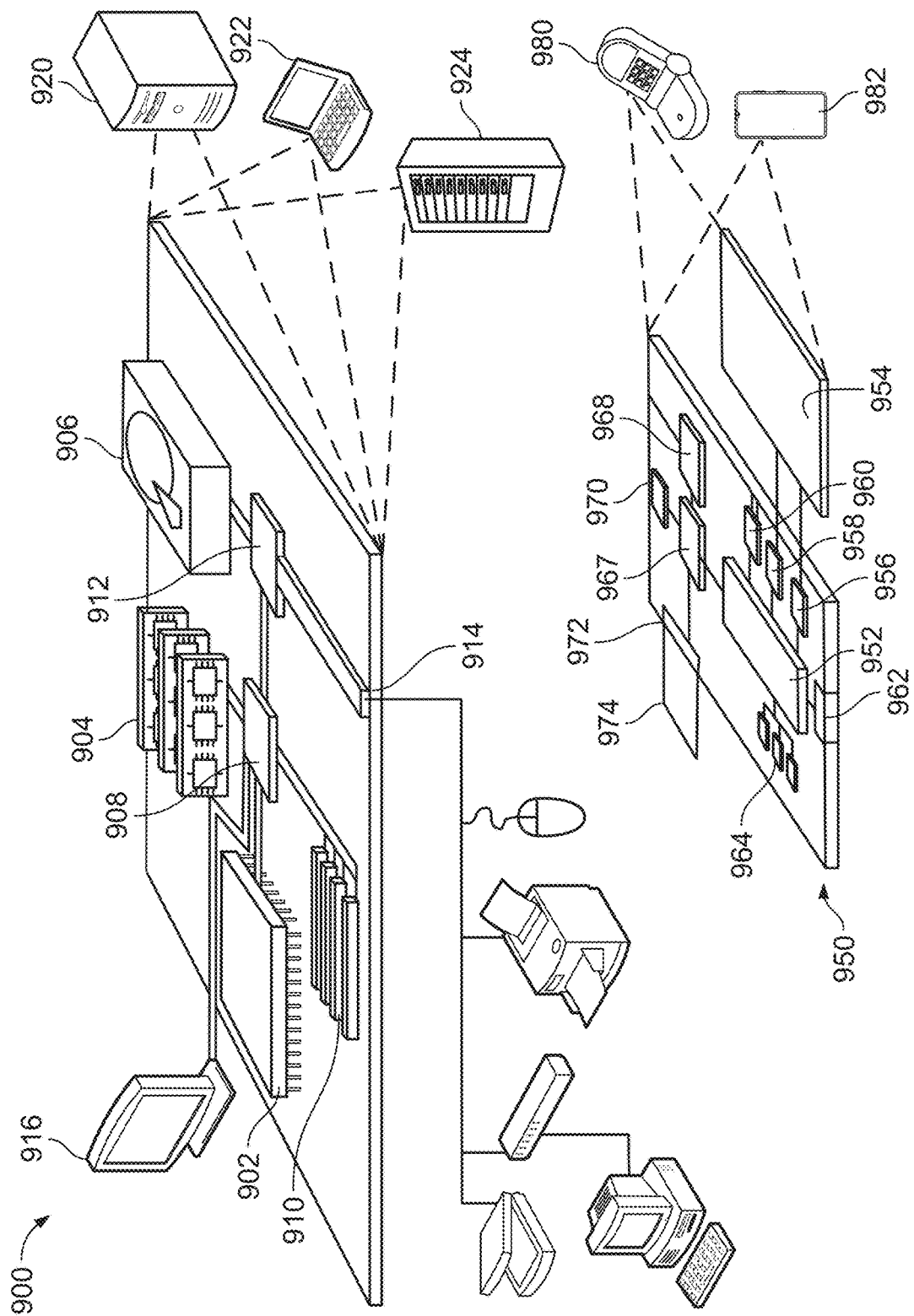
FIG. 9 illustrates an example of a computing device and a mobile computing device.

FIG. 9 shows an example of a computing device 900 and a mobile computing device 950 that can be used to implement the techniques described here. The computing device 900 is intended to represent various forms of digital computers, such as laptops, desktops, workstations, personal digital assistants, servers, blade servers, mainframes, cloud computing systems, and other appropriate computers. The mobile computing device 950 is intended to represent various forms of mobile devices, such as personal digital assistants, cellular telephones, tablet computers, smart-phones, and other similar computing devices. The components shown here, their connections and relationships, and their functions, are meant to be examples only, and are not meant to be limiting.

The computing device 900 includes a processor 902, a memory 904, a storage device 906, a high-speed interface 908 connecting to the memory 904 and multiple high-speed expansion ports 910, and a low-speed interface 912 connecting to a low-speed expansion port 914 and the storage device 906. Each of the processor 902, the memory 904, the storage device 906, the high-speed interface 908, the high-speed expansion ports 910, and the low-speed interface 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as a display 916 coupled to the high-speed interface 908. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 904 stores information within the computing device 900. In some implementations, the memory 904 is a volatile memory unit or units. In some implementations, the memory 904 is a non-volatile memory unit or units. The memory 904 may also be another form of computer-readable medium, such as a magnetic or optical disk, or a solid-state drive memory device.

The storage device 906 is capable of providing mass storage for the computing device 900. In some implementations, the storage device 906 may be or contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 902), perform one or more processes or methods, such as those described above. The instructions can also be stored by one or more storage devices such as computer- or machine-readable mediums (for example, the memory 904, the storage device 906, or memory on the processor 902).

The high-speed interface 908 manages bandwidth-intensive operations for the computing device 900, while the low-speed interface 912 manages lower bandwidth-intensive operations. Such allocation of functions is an example only. In some implementations, the high-speed interface 908 is coupled to the memory 904, the display 916 (e.g., through a graphics processor or accelerator), and to the high-speed expansion ports 910, which may accept various expansion cards. In the implementation, the low-speed interface 912 is coupled to the storage device 906 and the low-speed expansion port 914. The low-speed expansion port 914, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers, such as a cloud computing system or a virtual private cloud. In addition, it may be implemented in a personal computer such as a laptop computer 922. It may also be implemented as part of a rack server system 924. Alternatively, components from the computing device 900 may be combined with other components in a mobile device, such as a mobile computing device 950. Each of such devices may contain one or more of the computing device 900 and the mobile computing device 950, and an entire system may be made up of multiple computing devices communicating with each other.

The mobile computing device 950 includes a processor 952, a memory 964, an input/output device such as a display 954, a communication interface 967, and a transceiver 968, among other components. The mobile computing device 950 may also be provided with a storage device, such as a micro-drive or other device, to provide additional storage. Each of the processor 952, the memory 964, the display 954, the communication interface 967, and the transceiver 968, are interconnected using various buses, and several of the components may be mounted on a common motherboard or in other manners as appropriate.

The processor 952 can execute instructions within the mobile computing device 950, including instructions stored in the memory 964. The processor 952 may be implemented as a chipset of chips that include separate and multiple analog and digital processors. The processor 952 may provide, for example, for coordination of the other components of the mobile computing device 950, such as control of user interfaces, applications run by the mobile computing device 950, and wireless communication by the mobile computing device 950.

The processor 952 may communicate with a user through a control interface 958 and a display interface 956 coupled to the display 954. The display 954 may be, for example, a TFT (Thin-Film-Transistor Liquid Crystal Display) display or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may provide communication with the processor 952, so as to enable near area communication of the mobile computing device 950 with other devices. The external interface 962 may provide, for example, for wired communication in some implementations, or for wireless communication in other implementations, and multiple interfaces may also be used.

The memory 964 stores information within the mobile computing device 950. The memory 964 can be implemented as one or more of a computer-readable medium or media, a volatile memory unit or units, or a non-volatile memory unit or units. An expansion memory and/or processor 974 may also be provided and connected to the mobile computing device 950 through an expansion interface 972, which may include, for example, a SIM (subscriber identity module) card interface. The expansion memory 974 may provide extra storage space for the mobile computing device 950, or may also store applications or other information for the mobile computing device 950. Specifically, the expansion memory 974 may include instructions to carry out or supplement the processes described above, and also may include secure information such as unique identifying numbers or security keys. Thus, for example, the expansion memory 974 may be provided as a security module for the mobile computing device 950, and may be programmed with instructions that permit secure use of the mobile computing device 950. In addition, secure applications may be provided via the SIM cards, along with additional information, such as placing identifying information on the SIM card in a non-hackable manner.

The memory may include, for example, flash memory and/or NVRAM memory (non-volatile random access memory), as discussed below. In some implementations, instructions are stored in an information carrier. The instructions, when executed by one or more processing devices (for example, processor 952), perform one or more methods, such as those described above. The instructions can also be stored by one or more storage devices, such as one or more computer- or machine-readable mediums (for example, the memory 964, the expansion memory 974, or memory on the processor 952). In some implementations, the instructions can be received in a propagated signal, for example, over the transceiver 968 or the external interface 962.

The mobile computing device 950 may communicate wirelessly through the communication interface 967, which may include digital signal processing circuitry where necessary. The communication interface 967 may provide for communications under various modes or protocols, such as 4G, 5G, GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 968 using a radio-frequency. In addition, short-range communication may occur, such as using a Bluetooth, Wi-Fi, near-field communication (NFC) or other such transceiver. In addition, a GPS (Global Positioning System) receiver module 970 may provide additional navigation- and location-related wireless data to the mobile computing device 950, which may be used as appropriate by applications running on the mobile computing device 950.

The mobile computing device 950 may also communicate audibly using an audio codec 960, which may receive spoken information from a user and convert it to usable digital information. The audio codec 960 may likewise generate audible sound for a user, such as through a speaker, e.g., in a handset of the mobile computing device 950. Such sound may include sound from voice telephone calls, may include recorded sound (e.g., voice messages, music files, etc.) and may also include sound generated by applications operating on the mobile computing device 950.

The mobile computing device 950 may be implemented in a number of different forms, as shown in the figure. For example, it may be implemented as a cellular telephone 980. It may also be implemented as part of a smart-phone 982, tablet, phablet, personal digital assistant, or other similar mobile computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, solid state drives, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A system comprising:
a security and vulnerability analysis processor;
a prediction engine configured to select and execute one or more machine learning models and generate a desired prediction;
one or more endpoint devices in communication with the security and vulnerability analysis processor through a communication network, the one or more endpoint devices generating telemetry data used by the one or more machine learning models to generate the desired prediction;
a vulnerability data ingestion processor configured to obtain, from one or more data sources, security data associated with the one or more endpoint devices, wherein the security data includes at least vulnerability data associated with the one or more endpoint devices;
a centralized database including one or more data repositories containing the security data and storing predictions generated by the machine learning models, and wherein the security data is available as an input for training the one or more machine learning models;
a contextualization engine configured to process the security data from the centralized database, correlate new vulnerability data against existing vulnerability data, attribute any newly resulting vulnerability to a particular endpoint device, and update an endpoint vulnerability profile within the centralized database with the newly resulting vulnerability attributed to the particular endpoint device;
a data ingestion module configured to extract telemetry data from the one or more data repositories based on the desired prediction to be generated by the selected machine learning model and transform the extracted telemetry data into a telemetry data structure required by the particular machine learning model selected;
wherein the prediction engine processes the telemetry data structure associated with the particular endpoint device using the selected machine learning model to generate a prediction about risk impact of conducting vulnerability remediation to the particular endpoint device, and wherein the prediction engine generates meta data about the performance of the machine learning model to generate the prediction about the risk impact; and
a data output module configured to receive the prediction about the risk impact of conducting vulnerability remediation to the particular endpoint device, and store the prediction in the centralized database for reference in making remediation decisions about the particular endpoint device.

2. The system of claim 1 wherein conducting vulnerability remediations further comprises the security and vulnerability processor instructing automated application of one of a security patch or a software update to the one or more endpoint devices.

3. The system of claim 1 wherein the telemetry data generated by the one or more endpoint devices represents the operating status of processes running on the endpoint devices, and wherein the telemetry data is fed back to the machine learning model to generate modified predictions about the risk impact of conducting vulnerability remediations to the particular endpoint device.

4. The system of claim 1 wherein each of the one or more endpoint devices further comprises an endpoint agent processor configured to collect and report one or more of application, operating system, hardware data, and subsequent changes to the one or more endpoint devices back to the security and vulnerability analysis processor.

5. The system of claim 4 wherein the endpoint agent processor includes:

a registration and reporting module configured to conduct initial registration of the one or more endpoint devices and the endpoint agent;
a data collection module configured to obtain application, operating system, and/or hardware data represented by the one or more endpoint devices;
a change monitoring module configured to monitor for any changes to the local application, operating system, and/or hardware execution data on the one or more endpoint devices; and
an instruction collection module configured to retrieve and execute instructions from the security and vulnerability analysis processor.

6. The system of claim 1 wherein the security and vulnerability processor sends instructions to the one or more endpoint devices and triggers reporting and communication of the telemetry data back to the security and vulnerability processor.

7. The system of claim 1 further comprising an endpoint data collection module in communication with the security and vulnerability analysis processor, wherein the endpoint data collection module is configured to receive one or more host reports from a registered endpoint agent or an endpoint proxy.

8. The system of claim 1 further comprising a vulnerability and endpoint data correlation module in communication with the security and vulnerability analysis processor, wherein the vulnerability and endpoint data correlation module is configured to attribute vulnerabilities to one or more of applications, operating systems, and/or hardware data associated with a registered endpoint agent or an endpoint proxy.

9. The system of claim 1 further comprising an endpoint registration module in communication with the security and vulnerability analysis processor, wherein the endpoint registration module is configured accept a registration request from a registered endpoint agent or an endpoint proxy.

10. The system of claim 1 wherein the prediction engine is configured to select at least one machine learning model from a collection of machine learning models based on the amount and type of data stored within the one or more data repositories.

11. The system of claim 1 wherein the machine learning model is trained using a training set comprising the security data associated with the one or more endpoint devices.

12. The system of claim 1 wherein the telemetry data includes one or more metrics defining percentage of successful patch installation, percentage of detected disruptions, percentage of reported disruptions, and time since previous remediation.

13. A system comprising:
a security and vulnerability analysis processor;
a prediction engine configured to execute one or more machine learning models and generate a desired prediction;
one or more endpoint devices in communication with the security and vulnerability analysis processor through a communication network, the one or more endpoint devices generating telemetry data used by the one or more machine learning models to generate the desired prediction;
a vulnerability data ingestion processor configured to obtain, from one or more data sources, security data associated with the one or more endpoint devices, wherein the security data includes at least vulnerability data associated with the one or more endpoint devices;

a centralized database including one or more data repositories containing the security data and storing predictions generated by the machine learning models, and wherein the security data is available as an input for training the one or more machine learning models; and
a contextualization engine configured to process the security data from the centralized database, correlate new vulnerability data against existing vulnerability data, attribute any newly resulting vulnerability to a particular endpoint device, and update an endpoint vulnerability profile within the centralized database with the newly resulting vulnerability attributed to the particular endpoint device;
the prediction engine configured to select at least one machine learning model from a collection of machine learning models based on the amount and type of data stored within the one or more data repositories;
wherein the prediction engine processes the telemetry data associated with a particular endpoint device using the selected machine learning model to generate a prediction about risk impact of conducting vulnerability remediation to the particular endpoint device.

14. The system of claim 13 further including a data ingestion module configured to extract telemetry data from the one or more data repositories based on the desired prediction to be generated by the selected machine learning model and transform the extracted telemetry data into a telemetry data structure required by the particular machine learning model selected.

15. The system of claim 13 wherein the prediction engine generates metadata about the performance of the machine learning model to generate the prediction about the risk impact of conducting vulnerability remediation to the particular endpoint device.

16. The system of claim 13 further including a data output module configured to receive the prediction about the risk impact of conducting vulnerability remediation to the particular endpoint device, and store the prediction in the central database for reference in making remediation decisions about the particular endpoint device.

17. The system of claim 13 wherein the machine learning model is trained using a training set comprising the security data associated with the one or more endpoint devices.

18. The system of claim 13 wherein the telemetry data includes one or more metrics defining percentage of successful patch installation, percentage of detected disruptions, percentage of reported disruptions, and time since previous remediation.

19. A method of generating decisioning predictions using a security and vulnerability analysis processor, the method comprising:
providing a prediction engine, the prediction engine selecting and executing one or more machine learning models to generate a desired prediction;
providing one or more endpoint devices in communication with the security and vulnerability analysis processor through a communication network, and generating, by the one or more endpoint devices, telemetry data for use by the one or more machine learning models to generate the desired prediction;
obtaining from one or more data sources, using a vulnerability data ingestion processor, security data associated with the one or more endpoint devices, wherein the security data includes at least vulnerability data associated with the one or more endpoint devices;
storing the security data and storing predictions generated by the machine learning model in a centralized database, wherein the centralized database includes one or more data repositories, and wherein the security data is available as an input for training the one or more machine learning models;

the security and vulnerability analysis processor contextualizing the security data from the centralized database, correlating new vulnerability data against existing vulnerability data, attributing any newly resulting vulnerability to a particular endpoint device, and updating an endpoint vulnerability profile within the centralized database with the newly resulting vulnerability attributed to the particular endpoint device;

extracting, using a data ingestion module, telemetry data from the one or more data repositories based on the desired prediction to be generated by the selected machine learning model, and transforming the extracted telemetry data into a telemetry data structure required by the selected machine learning model;

processing, using the prediction engine, the telemetry data structure associated with the particular endpoint device using the selected machine learning model to generate a prediction about risk impact of conducting vulnerability remediation to the particular endpoint device; and receiving, by a data output module, the prediction about the risk impact of conducting vulnerability remediation to the particular endpoint device, and storing the prediction in the centralized database for reference in making remediation decisions about the particular endpoint device.

20. The method of claim 19 further comprising generating, by the prediction engine, meta data about the performance of the machine learning model that generated the prediction about the risk impact of conducting vulnerability remediation to the particular endpoint device.

21. The method of claim 19 further comprising selecting, by the prediction engine, at least one machine learning model from a collection of machine learning models based on the amount and type of data stored within the one or more data repositories.

22. The method of claim 19 further comprising invoking the prediction engine based on the amount and type of data stored within the one or more data repositories.

23. The method of claim 19 further comprising invoking the prediction engine based on the desired prediction to be generated.

24. The method of claim 19 further comprising instructing, by the security and vulnerability processor, automated application of one of a security patch or a software update to the one or more endpoint devices.

25. The method of claim 19 wherein the telemetry data generated by the one or more endpoint devices represents the operating status of processes running on the endpoint devices, and further comprising feeding back the telemetry data to the machine learning model to generate modified predictions about the risk impact of conducting vulnerability remediation to the particular endpoint device.

26. The method of claim 19 wherein each of the one or more endpoint devices further comprise an endpoint agent processor collecting and reporting one or more of application, operating system, hardware data, and subsequent changes to the one or more endpoint devices back to the security and vulnerability analysis processor.

27. The method of claim 19 further comprising sending instructions from the security and vulnerability processor to the one or more endpoint devices and triggering reporting and communicating the telemetry data back to the security and vulnerability processor.

28. The method of claim 19 further comprising receiving at an endpoint data collection module, in communication with the security and vulnerability analysis processor, one or more host reports from a registered endpoint agent or an endpoint proxy.

29. The method of claim 19 further comprising training the machine learning model using a training set comprising the security data associated with the one or more endpoint devices.

30. The method of claim 19 wherein the telemetry data includes one or more metrics defining percentage of successful patch installation, percentage of detected disruptions, percentage of reported disruptions, and time since previous remediation.

31. The method of claim 19 further comprising generating, using the prediction engine, a forward-looking prediction of the risk impact of conducting vulnerability remediation using a future patch.

* * * * *